United States Patent
Yamada et al.

(10) Patent No.: US 6,298,236 B1
(45) Date of Patent: *Oct. 2, 2001

(54) METHOD OF USE OF A CONTROL CHANNEL IN A CELLULAR COMMUNICATIONS SYSTEM

(75) Inventors: Jun Yamada; Masaki Terashima, both of Yokohama; Jun Nagamatsu, Kawasaki, all of (JP)

(73) Assignee: Matsushita Electric Industrial Company, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/191,159

(22) Filed: Nov. 13, 1998

Related U.S. Application Data

(63) Continuation of application No. 08/840,901, filed on Apr. 17, 1997, now Pat. No. 5,907,806, which is a continuation of application No. 08/218,509, filed on Mar. 25, 1994, now abandoned.

(30) Foreign Application Priority Data

Mar. 26, 1993 (JP) .................................................. 5-068659

(51) Int. Cl.[7] ..................................................... H04Q 7/32
(52) U.S. Cl. ........................ 455/434; 455/454; 455/515; 455/166.1; 455/185.1
(58) Field of Search .............................. 455/62, 434, 454, 455/455, 515, 516, 426, 464, 161.2, 161.1, 185.1, 186.1, 166.1, 166.2, 520, 449, 432, 513, 63; 340/825.44

(56) References Cited

U.S. PATENT DOCUMENTS

| | | | |
|---|---|---|---|
| 4,850,033 | * | 7/1989 | Eizenhofer et al. .................. 455/434 |
| 5,066,949 | * | 11/1991 | Breeden et al. ................. 340/825.44 |
| 5,093,926 | * | 3/1992 | Sasuta ................................... 455/520 |
| 5,150,362 | * | 9/1992 | Akerberg .............................. 455/434 |
| 5,276,905 | * | 1/1994 | Hurst et al. ........................... 455/432 |
| 5,276,908 | * | 1/1994 | Koohgoli et al. ....................... 455/63 |
| 5,353,332 | * | 10/1994 | Raith et al. .......................... 455/449 |
| 5,475,866 | * | 12/1995 | Ruthenberg ............................ 455/62 |
| 5,497,508 | * | 3/1996 | George .............................. 455/161.2 |
| 5,603,081 | * | 2/1997 | Raith et al. .......................... 455/434 |
| 5,655,217 | * | 8/1997 | Lemson .................................. 455/62 |
| 5,970,057 | * | 10/1999 | Raith .................................. 455/513 |

\* cited by examiner

*Primary Examiner*—Lester G. Kincaid
(74) *Attorney, Agent, or Firm*—Amster, Rothstein & Ebenstein

(57) ABSTRACT

A microcellular communication system which broadcasts its local channel block, including the control channels allotted from a total channel block to the microcellular system, on all control channels being used by the system. A mobile unit seeking access to the microcellular system initially searches the total channel block in an effort to receive the local channel block information broadcast by the microcellular system. The mobile unit compares received local channel block information with stored total channel block information and replaces its memory content with the newly received information. Periodic searching of stored channel block information is conducted to verify that the mobile unit has the relevant channel block information for the local microcellular system.

17 Claims, 3 Drawing Sheets

METHOD OF USE OF A CONTROL CHANNEL IN A CELLULAR COMMUNICATIONS SYSTEM

This application is a continuation of application Ser. No. 08/840,901, filed on Apr. 17, 1997 now U.S. Pat. No. 5,907,806, which is a continuation of application Ser. No. 08/218,509, filed on Mar. 25, 1994 now abandoned.

FIELD OF THE INVENTION

The present invention relates generally to a cellular telephone network. More specifically, it relates to a method of use of a wireless control channel in a microcellular system.

BACKGROUND OF THE INVENTION

In a representative zone structure for a cellular communication system, such as is illustrated in FIG. 3A–3C, a repeating pattern is formed with a number of hexagonal cells or zones; e.g., four cells in FIG. 3A, seven cells in FIG. 3B, and 12 cells in FIG. 3C. In each cell pattern, the same control channel, or number of control channels, is allotted to each cell having the same designation (in this instance, the same digit 1–12) assigned thereto. No two adjacent cells are assigned the same designation and control channels, in order to avoid the effects of local interference. The number of control channels allotted to each cell is pre-assigned in a fixed manner.

For a microcellular system (MCS), it has been usual to allot control channels for each service area in a fixed manner, similar to the system employed for an ordinary cellular system described above. However, when applying the standard control channel allotting method to an MCS, problems are encountered. For example, it is difficult to arrange cells in an MCS in a regular manner, such as the hexagonal layout shown in FIGS. 3A–3C, and is correspondingly difficult, therefore, to allot control channels in a fixed manner. Furthermore, since the number of zones to be covered differs greatly for each MCS, there are many cases in which the number of channels required must be changed for each such system. A mobile unit seeking to obtain service in one of a plurality of MCS's must, consequently, store information relating to all of the control channels which might be used and must search all of the stored control channels in order to find the control channels allotted to the local MCS for each use. The time involved in such searching significantly inhibits usage of a mobile unit.

It is, therefore, an objective of the present invention to provide a method of use of a control channel in an MCS in which a required control channel or channels may be arbitrarily selected depending upon the conditions under which the MCS is to be used.

It is a further objective of the invention to provide a method of use of a control channel whereby a mobile unit can locate a control channel for the MCS in a minimum search time.

SUMMARY OF THE INVENTION

These and other objectives are realized by the present invention wherein a control channel block can be arbitrarily allotted to an MCS according to the conditions under which the MCS is placed for use. The MCS broadcasts its channel block, comprising the control channel(s) allotted to the MCS, on all of the control channels being used by that MCS. A mobile unit seeking access to an MCS initially searches all of the control channels in a stored total channel block in an effort to receive the channel block information which is being broadcasted from the MCS. The mobile unit then compares the received channel block information to the channel block information already stored therein and replaces its memory content with the newly received channel block information, if different from the stored information. All of the channels in a stored channel block are searched in accordance with a predetermined search cycle to locate an available control channel. If the mobile unit is moved and no control channel is identified during a search of the stored channel block, a search is made of the total channel block in an attempt to locate a control channel, preferably at a search cycle which is longer than the predetermined cycle given the time necessary to conduct the total search.

BRIEF DESCRIPTION OF THE DRAWINGS

The invention will now be further described with reference to the attached Figures wherein.

DETAILED DESCRIPTION OF THE PREFERRED EMBODIMENTS

Figure 1:
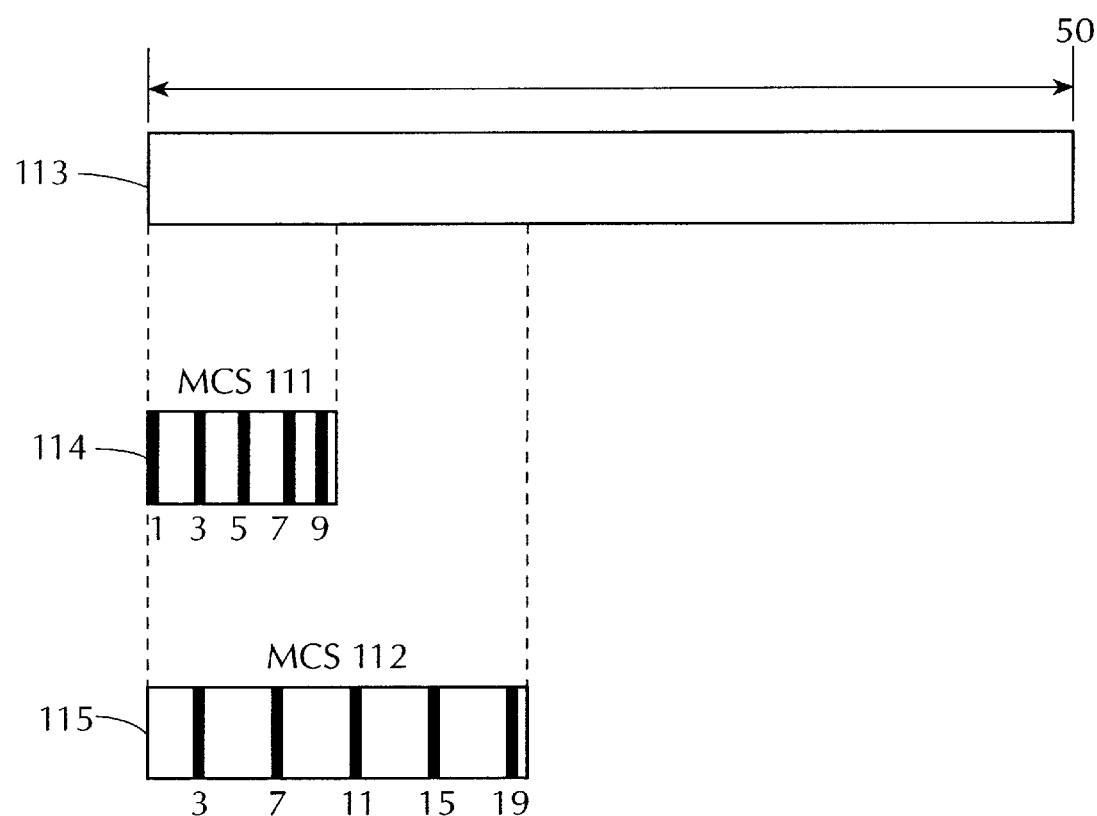
FIG. 1 provides an illustration of the allotment of control channels in an MCS.

In FIG. 1, it is assumed that there are two microcellular systems (MCS's 111 and 112) and that the control channels for the MCS's may be selected from a total channel block 113 of fifty (50) channels. It is further assumed that five control channels are allotted for use by MCS 111, specifically channels 1, 3, 5, 7 and 9 of channel block 114 which is comprised of channels 1–10. Similarly, five control channels are allotted for use by MCS 112, including control channels 3, 7, 11, 15 and 19 from channel block 115 which is comprised of channels 1–20. The reason why the number of control channels allotted to the two MCS's is different is that the state of use of channels differs in the areas where the MCS's are located. For future adaptability of each of the MCS's, should there be a need to add or modify control channels for the MCS, control channels can be selected from the relevant channel block, such that channels 1–10 in channel block 114 will be available for use by MCS 111 and channels 1–20 from channel block 115 will be available for use by MCS 112. If a new MCS is to added and installed anew in the future, a block of control channels will be allotted from the fifty control channels of total channel block 113.

As noted above with reference to past systems, a mobile unit wanting to find a control channel had been required to search all of the channels in the total channel block (i.e., channels 1–50 in total channel block 113) every time in order to locate the MCS and retrieve a control channel for use. However, in accordance with the present invention, the channel block in each MCS is broadcasted from all of the control channels in use in that MCS. That is, with reference to FIG. 1, information relating to channel block 114, comprising channels 1–10, is broadcast from all of the 5 control channels used by MCS 111. Therefore, channels 1, 3, 5, 7 and 9 broadcast the local channel block information. Similarly, channels 3, 7, 11, 15 and 19 broadcast the information for channel block 115 comprising channels 1–20 for MCS 112.

Figure 2:
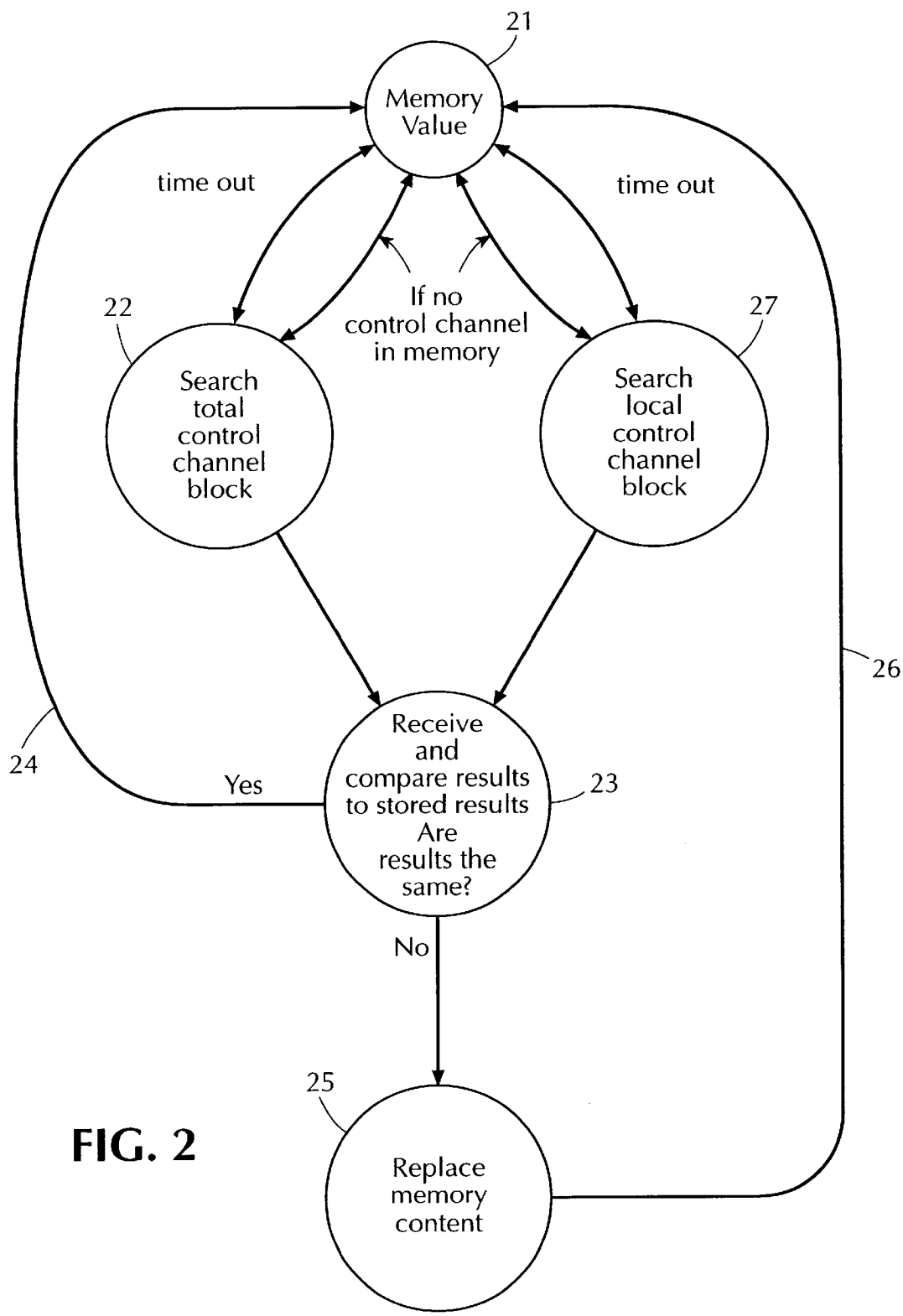
FIG. 2 details a representative algorithm by which a mobile unit locates a control channel of the MCS for use.
Figure 3A:
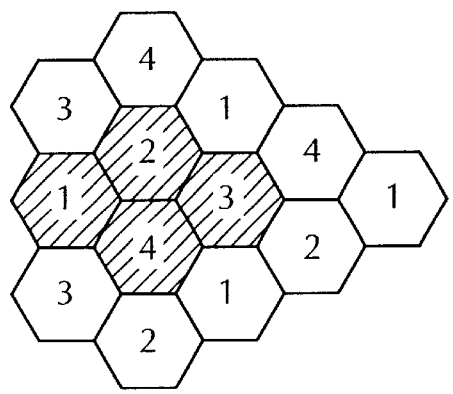
FIGS. 3A through 3C illustrate representative regular zone structures in a typical cellular communications system.
Figure 3B:
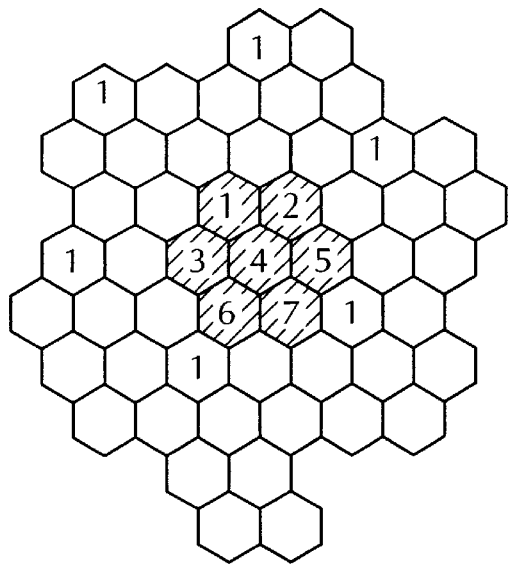
Figure 3C:
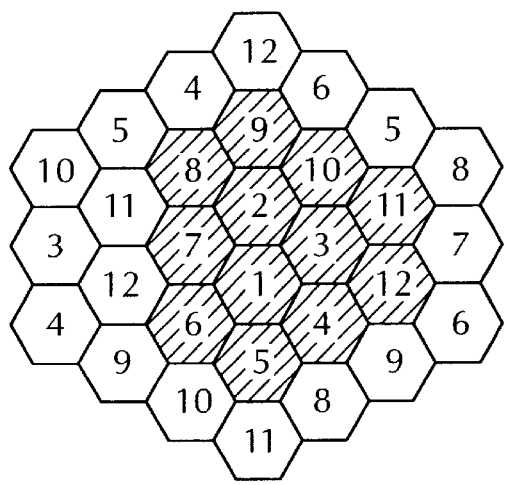

A mobile unit will receive the broadcast information, as detailed with reference to FIG. 2. At "idle" time, a mobile terminal will have in its memory, as depicted at box 21, either a "zero" value (i.e., at start up) or the contents of a total channel block. A search will be conducted by the mobile unit, at box 22, at a time when the memory value of the channel block information is zero (i.e., in its initial state) or upon occurrence of a pre-determined event, such as upon turning on the unit's power source, or at pre-set intervals in response to a timer signal. If a control channel of any MCS is located, the mobile unit receives the channel block information which is being broadcast by that control channel and stores the content thereof, at box 23, whereby the received information is automatically stored, as indicated by line 24 from box 23 to box 21. If there is stored channel block information already in the mobile unit's memory location, a comparison is made between the stored channel block information and the received channel block information. If the comparison indicates that the currently-stored channel block information is the same as the received information, then no further updating is required. If, however, the received channel block information differs from that which is currently in storage, the memory content is renewed with the received channel block information, as indicated by line 26 from box 25 to box 21. Once the memory location has been provided with the received channel block information, via line 24 or line 26, in order to locate an MCS the mobile unit searches only those channels of the received channel block stored in the memory location. A search, at box 27, may be conducted periodically or continually.

As an example of the operation of the inventive system, assume that a mobile unit, which is completely in an initial state and therefore has a channel block information memory value of zero, comes into the area of MCS 111 for the first time. The mobile unit carries out a total channel block search, from channels 1–50, discovers a control channel of MCS 111 (one of the control channels 1, 3, 5, 7 or 9 allotted for MCS 111 and broadcasting such information) and receives the information for channel block 114 associated with MCS 111. The mobile unit stores the received channel block information and, in a subsequent channel search at box 27, searches only channels 1–10 in the received channel block. By this system, as long as the mobile unit moves into an MCS 111 area, the MCS can be detected in a search time which is one-fifth (10 channels out of 50 channels) of the time previously needed for a control channel search.

Thereafter, if the mobile unit moves into the area of MCS 112, the mobile unit continues to carry out channel searches of channel block 114 (i.e., channels 1–10) with a predetermined cycle, and since there are channels allotted to MCS 112 among the searched channels, specifically channels 3 and 7, it is possible for the mobile unit to detect MCS 112. The mobile unit will receive, along channel 3 or 7, the information for channel block 115 as allotted to MCS 112, which information is being broadcast on the control channels of MCS 112. Upon comparison, at box 23, it will become apparent that the received channel block (115) information differs from the stored channel block (114) information and the stored content will be renewed to contain the newly received channel block information pertaining to channel block 115 comprising channels 1–20. In this example, once the mobile unit has stored the received channel block information for MCS 112, all subsequent channel searches of the channel block 115 information (i.e., searches of channels 1–20 associated with MCS 112) at the predetermined cycle will detect any control channel for either MCS 111 or MCS 112.

In the instance for which the mobile unit moves from a first MCS to a second MCS in which control channels used by the first MCS are not used by the second MCS, the mobile unit should carry out a total channel block (channels 1–50) search with an appropriate, yet not so frequent, cycle. Therefore, it is preferable to make this cycle long, as compared with the cycle in which the channel search is carried out within a stored channel block, given the additional time required for a total control channel search.

In the instance for which the newly received channel block information for a second MCS is smaller that the channel block information stored in the memory for a first MCS, the received channel block information can be stored in place of the previously stored information. However, it may be preferable not to renew the memory contents since the mobile unit may re-enter the first MCS at a later time and would then have to engage in a total search to discover a control channel for the first MCS again. Therefore, it can be programmed that it is only necessary to renew the memory contents if the newly received channel block information includes and is larger that the channel block information which has already been stored in the memory.

While the present invention has been described with specific reference to a preferred embodiment, it is apparent that modifications to the components and process flow may be made without departing from the spirit and scope of the invention as set forth in the appended claims.

What is claimed is:

1. A method by which a mobile communication unit locates at least one of a plurality of control channels for controlling communication in a microcellular communication system (MCS) operating in a local area, said MCS using as control channels a subset of channels in a channel block allocated to said MCS in accordance with local channel use conditions from a total control channel block, comprising the steps of:

initially scanning the channels of said total control channel block;

detecting and receiving, on said scanned channels, a number representing a range of channels, transmitted by said MCS, defining said allocated channel block in which at least one control channel is located;

storing said number representing said range of channels; and scanning only said range of channels to locate said at least one control channel available for communication on said MCS as long as said mobile communication unit remains in said local area.

2. The method of claim 1 further comprising the steps of:

periodically scanning only said range of channels to detect and receive a newly-transmitted number representing a new range of channels;

comparing said newly-transmitted number to said stored number; and replacing said stored number with said newly-transmitted number when different.

3. The method of claim 2 wherein said stored number is replaced only when the newly-transmitted number is greater than said stored number.

4. The method of claim 2 further comprising the step of scanning said new range of channels to locate said at least one control channel available for controlling communication on said MCS.

5. The method of claim 2 further comprising the step of scanning all channels of said total control channel block when said periodic scanning of said new range of channels fails to detect at least one of said plurality of control channels.

6. A method for communicating the location of at least one control channel to a mobile unit operating within a microcellular communication system (MCS) operating in a local area, said MCS using as control channels a subset of channels in a channel block allocated to said MCS in accordance with local channel use conditions from a total control channel block, comprising the steps of:

transmitting a number representing a range of channels on all of said control channels to said mobile unit in which at least one control channel is located; and scanning, with said mobile unit, only said range of channels to locate at least one control channel.

7. A method by which a mobile communication unit locates a control channel for controlling communication in a microcellular communication system (MCS) operating in a local area, said MCS using as control channels a subset of channels in a channel block allocated to said MCS in accordance with local channel use conditions from a total control channel block, comprising the steps of:

transmitting a number representing a range of channels along all of said control channels defining said allocated channel block in which at least one control channel is located;

scanning, with said mobile unit, channels of said total control channel block and detecting said transmitted number; and storing said number at said mobile unit, said mobile unit thereafter scanning only said range of channels to locate said control channel as long as said mobile communication unit remains in said local area.

8. The method of claim 7 further comprising the steps of:

periodically scanning only said stored range of channels to detect a newly-transmitted number representing a new range of channels;

receiving said newly-transmitted number;

comparing said stored number to said newly-transmitted number; and replacing said stored number with said newly-transmitted number when different.

9. The method of claim 8 whereby said stored number is replaced only when said newly-transmitted number is greater than said stored number.

10. The method of claim 8 further comprising the steps of:

scanning said total control channel block when said periodic scanning fails to detect said transmitted number.

11. A microcellular communication system (MCS) operating in a local area which utilizes control channels for controlling communications between mobile units operating in said MCS, wherein said control channels are located in a range of channels allocated to said MCS in accordance with local channel use conditions from a total control channel block, wherein a number representing said range is broadcast to said mobile units along all of said control channels and said mobile units scan only said range as long as said mobile units remain in said local area to locate at least one of said control channels.

12. A method by which a mobile communication unit locates a control channel for controlling communication in a microcellular communication system (MCS) operating in a local area, said MCS using as control channels a subset of channels in a channel block allocated to said MCS in accordance with local channel use conditions from a total control channel block, comprising the steps of:

transmitting a number representing a range of channels on said subset of channels defining the size of said channel block allocated to said MCS;

scanning all channels of said total control channel block upon commencement of operation of said mobile unit to receive said transmitted number;

storing at said mobile communication unit said transmitted number representing said range of channels in which at least one MCS control channel is located; and scanning only said range of channels to locate said MCS control channel as long as said mobile communication unit remains in said local area.

13. The method of claim 12 further comprising the steps of:

periodically scanning said range of channels to receive a newly-transmitted number representing a new range of channels;

comparing said newly transmitted number to said stored number; and replacing said stored number with said newly-transmitted number when different.

14. The method of claim 13 wherein said stored number is replaced only when said newly-transmitted number is greater than said stored number.

15. The method of claim 13 further comprising the steps of:

scanning only said new range of channels to locate at least one of a plurality of control channels available for communication on said MCS.

16. The method of claim 13 further comprising the steps of scanning said channels of said total control channel block when said periodic scanning fails to locate a control channel.

17. A method by which a mobile communication unit locates a control channel for use in controlling communication in a microcellular communication system (MCS) operating in a local area, said MCS using as control channels a subset of channels in a channel block allocated to said MCS in accordance with local channel use conditions from a total control channel block, comprising the steps of:

transmitting a number representing a range of channels on said subset of channels defining the size of said channel block allocated to said MCS;

storing at said mobile communication unit said transmitted number;

first scanning only said range of channels to locate said control channel as long as said mobile communication unit remains in said local area; and later scanning all channels in said total control channel block to locate said control channel when said first scanning fails to locate said control channel.

* * * * *